United States Patent [19]

Kathnelson et al.

[11] Patent Number: 5,495,887
[45] Date of Patent: Mar. 5, 1996

[54] TEMPERATURE CONTROL SYSTEM AND CONTROLLER THEREFOR

[75] Inventors: Jerry Kathnelson, Nepean; Michael S. D. Reid, Burgeo, both of Canada

[73] Assignee: Erie Manufacturing (Canada) Co. Limited, Stouffville, Canada

[21] Appl. No.: 64,653

[22] Filed: May 21, 1993

[51] Int. Cl.⁶ .................................................. F25B 29/00
[52] U.S. Cl. .............................. 165/11.1; 165/22; 165/27; 236/49.3; 236/78 B; 236/1 B; 236/1 C
[58] Field of Search ............................. 165/11.1, 12, 22, 165/16, 27; 236/1 C, 49.3, 1 B, 78 B

[56] References Cited

U.S. PATENT DOCUMENTS

| | | | |
|---|---|---|---|
| 3,724,534 | 4/1973 | Weatherston | 165/12 |
| 4,530,395 | 7/1985 | Parker et al. | 236/1 C |
| 4,673,029 | 6/1987 | Beachboard | 165/22 |
| 4,830,095 | 5/1989 | Friend | 165/22 |
| 4,886,110 | 12/1989 | Jackson | 165/22 |
| 4,931,948 | 6/1990 | Parker et al. | 236/1 C |
| 4,997,029 | 3/1991 | Otsuka et al. | 165/22 |
| 5,181,653 | 1/1993 | Foster et al. | 236/49.3 |
| 5,303,767 | 4/1994 | Riley | 236/1 C |
| 5,333,676 | 8/1994 | Mizuno | 165/11.1 |

*Primary Examiner*—John K. Ford
*Attorney, Agent, or Firm*—Jacobson, Price, Holman & Stern

[57] ABSTRACT

A temperature control system for a building structure such as a household is divided into a plurality of zones. A controller acts between temperature sensing devices in each of the zones and an adjustable thermostat which allows the desired temperature in the building structure to be selected. The controller allows individual zones to be selected to receive conditioned air and allows one of the selected zones to be designated as a control zone. A heating or cooling decision for the temperature control system for all of the selected zones is made based on the difference between the thermostat setting and the output of the temperature sensing device in the control zone. The control zone can be changed manually to the next available selected zone. Different visual indications are given for the control zone and the selected zones. Zones with faulty temperature sensing devices cannot be control zones or selected zones.

24 Claims, 11 Drawing Sheets

TEMPERATURE CONTROL SYSTEM AND CONTROLLER THEREFOR

FIELD OF THE INVENTION

The present invention relates to heating, ventilation and air conditioning systems and in particular to a zoned temperature control system which provides conditioned air to selected zones while isolating unselected zones.

BACKGROUND OF THE INVENTION

Heating and air conditioning systems are well known and developments to improve them are continually being sought. One type of such a system is a zoned heating and air conditioning system. In this type of system, the building structure receiving conditioned air is divided into a number of zones with each zone receiving conditioned air according to its needs.

For example, U.S. Pat. No. 5,181,653 to Foster et al discloses a residential heating and air conditioning control system for a multi-zone residence. The system includes a heating and cooling unit connected to a duct system which leads to registers in each zone of the residence. A master thermostat is provided at one location in the residence while slave thermostats are provided in each of the zones. Dampers are provided throughout the duct system to allow the flow of conditioned air into each of the individual zones to be controlled. The master thermostat is connected to each slave thermostat and receives signals from the slave thermostats in response to differences between the sensed temperatures in the zone and the set point programmed into the thermostat. Each thermostat includes a display for displaying the thermostat set point as well as the sensed temperature in the zone. The master thermostat has a switch to allow a display of the slave thermostat set points and the sensed temperatures in each of the zones. The master thermostat also allows the temperature set point in each zone to be preprogrammed for different times of the day. In operation, when a slave thermostat detects a difference between its set point temperature and the temperature within the zone, it provides a control signal to the master thermostat which in turn controls the heating or cooling unit and the damper associated with that zone to provide conditioned air.

U.S. Pat. No. 4,886,110 to Jackson discloses an HVAC zone control system which includes a number of heating units, a number of cooling units and a blower to force air through the units to distribution ducts. When it is desired to cool air expelled by the blower, only the cooling units are operated and when it is desired to heat air, only the heating units are operated. The distribution ducts feed the air to a number of separate zones. Each zone includes a damper which is either opened or closed. Within each zone is a thermostat which monitors the temperature in the zone and provides output signals to a microprocessor. The microprocessor examines the output of the thermostats to detect whether the zones require heating or cooling. When a number of zones exceeding a threshold number request heating, the dampers at the non-requesting zones are shut and the heating unit is energized. The number of heating stages in the heating unit that are energized depends on the number zones requesting heating. When the zones reach the desired temperature, the thermostats stop providing output signals to the microprocessor. The cooling operation works in a similar manner. In an automatic mode, the number of requesting zones for heating or cooling is determined by calculating the difference between the two. If the difference value exceeds the threshold then either heating or cooling is performed depending on whether more zones request heating or cooling.

U.S. Pat. No. 4,830,095 to Friend discloses a temperature control system for an air conditioning system. Thermostats are provided in each zone of the system along with associated dampers to control air flow into each of the zones. The thermostats provide control signals to a control unit when the temperature in the zone differs from the set point of the thermostats. In the specific embodiment disclosed in this patent, zone 1 and zone 2 are connected to a common circuit in the control unit such that when zone 1 needs conditioned air and zone 2 does not, the damper in zone 2 is closed while the damper is zone 1 is kept open and vice versa. If both zones require conditioned air, the dampers to both zones 1 and 2 are kept open. Priority can be appointed in the event that both zones request conditioned air so that the zone which has been given priority is the only zone which receives conditioned air even though both zones may be requesting conditioned air. The control unit also prevents situations arising where all dampers are closed with the fan and heating or cooling unit operating.

U.S. Pat. No. 4,673,029 to Beachboard discloses a zoned heating and air conditioning system having two zones and two thermostats. The system includes two basically isolated air conditioning units which supply conditioned air to their respective zone. In operation, when a thermostat in one zone detects that conditioned air is required, it provides signals to close the dampers in the other zone so that conditioned air is only received in the zone requesting conditioned air.

U.S. Pat. No. 3,724,534 to Weatherston discloses a multi-zone control system with priority service. A thermostat is provided in each zone and is connected to a controller. The thermostats are polled by a scanner in the controller. Depending on the input the scanner receives from the thermostats, which compare the temperature in the zone with their set points, the controller algebraically adds all of the inputs received from the thermostats and makes a heating or cooling decision based on the thermostat output.

Although these heating and air conditioning systems are designed for zoned structures, they are not best suited for smaller structures such as households where during many times of the day certain areas of the household remain unoccupied for significant periods of time. Rather, these prior art heating and air conditioning systems for the most part, supply conditioned air to each zone where the detected temperature in the zone differs sufficiently from the temperature setting of the thermostat in the zone.

It is therefore an object of the present invention to provide a novel temperature control system and controller therefor.

SUMMARY OF THE INVENTION

According to one aspect of the present invention there is provided a temperature control system to supply conditioned air to a plurality of zones comprising:

at least one temperature sensing device in each of said zones;

a thermostat to allow a desired temperature setting to be selected; and a controller acting between said thermostat and said temperature sensing devices, said controller including selection means to allow one of said zones to be selected as a control zone whereby a heating or cooling decision for said temperature control system is made on the basis of the desired temperature setting and the output of the at least one temperature sensing device in said control zone.

Preferably, the selection means also allows individual zones to be selected by opening dampers to the selected zones to control the flow of conditioned air thereto, the dampers to deselected zones being maintained in a closed condition to isolate them from conditioned air. It is also preferred that the controller provides a visual indication of the selected zones and a different visual indication of the control zone.

Preferably, the controller inhibits zones having at least one faulty temperature sensing device from being selected and opens the dampers to zones having at least one faulty temperature sensing device. It is also preferred that the controller further includes connection means to connect the at least one temperature sensing device in the control zone to the thermostat.

Preferably, the zones are numerically ordered and the selection means includes user input means to allow the control zone to be changed, the selection means changing control from the existing control zone to the next available selected zone in response to user input. It is also preferred that the controller automatically appoints a zone as the control zone when the temperature control system is initialized.

Preferably, the controller initially examines the zones in numerical ascending order and appoints the first examined zone having a functioning temperature sensing device as the control zone. It is also preferred that the controller examines the remaining zones after the control zone has been appointed and automatically selects zones having functioning temperature sensing devices.

In another embodiment, at least one zone has at least two temperature sensing devices therein, the controller averaging the output of the at least two temperature sensing devices when the at least one zone is the control zone and a heating or cooling decision is being made. It is also preferred that the zones are selected to encompass areas which are typically occupied at different times to permit conditioned air to be conveyed to the occupied zones.

According to another aspect of the present invention there is provided a controller for a temperature control system, said temperature control system supplying conditioned air to a plurality of zones via ducts extending to each zone, each of said ducts having a damper therein actuable between an open condition wherein conditioned air is supplied to said zone and a closed condition wherein said zone is isolated from conditioned air, each of said zones having at least one temperature sensing device therein to sense the temperature in said zone, said temperature control system further including a thermostat to select the desired temperature in said system, said controller comprising:

selection means to allow one of said zones to be selected as a control zone; and control means responsive to said selection means acting between the temperature sensing device in said control zone and said thermostat whereby a heating or cooling decision for said temperature control system is made on the basis of the desired temperature setting and the output of the at least one temperature sensing device in said control zone.

In still yet another aspect of the present invention there is provided a controller for a temperature control system comprising:

a housing separable into at least two parts;

a connector assembly on one of said parts to receive wiring from components of said temperature control system;

a control board on the other of said parts to control the operation of said temperature control system in response to input from said wiring; and releasable connection means acting between said control board and said connector assembly to establish an electrical connection therebetween.

BRIEF DESCRIPTION OF THE DRAWINGS

An embodiment of the present invention will now be described more fully with reference to the accompanying drawings in which:

FIG. 3b is a perspective view of a portion of the controller illustrated in FIG. 3a;

DESCRIPTION OF THE PREFERRED EMBODIMENTS

Figure 1:
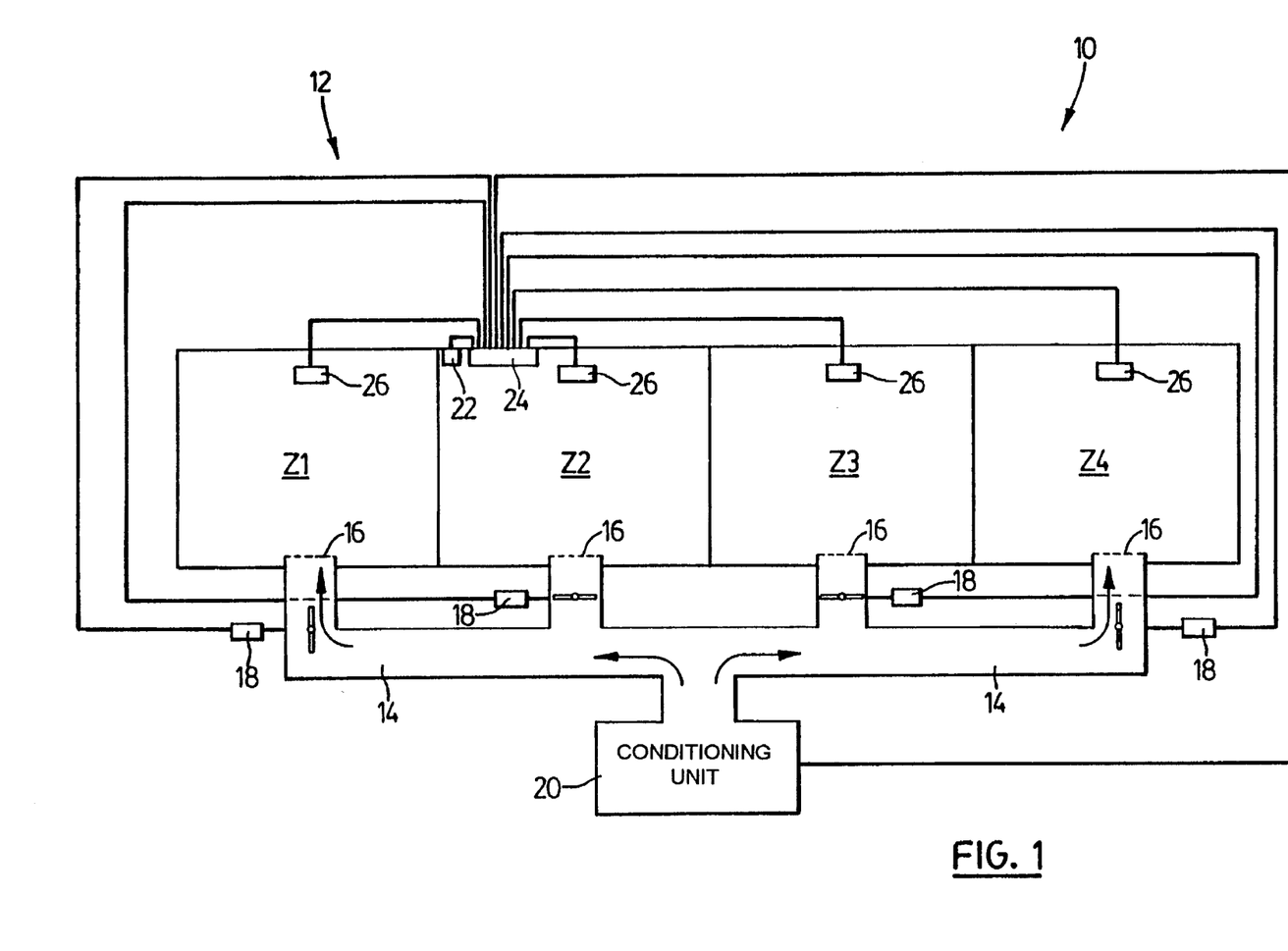
FIG. 1 is a schematic diagram of a zoned structure in which a temperature control system is located.
Figure 2:
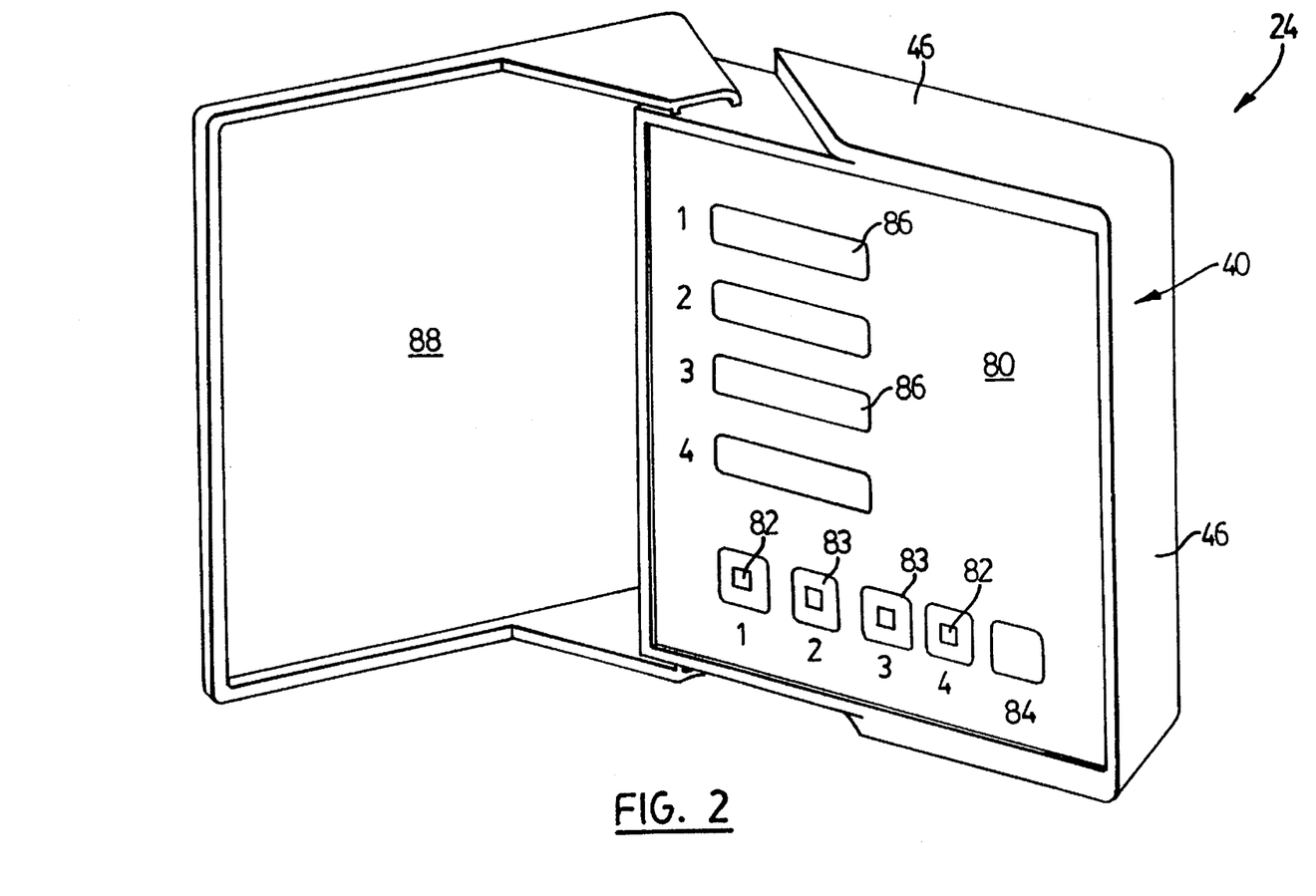
FIG. 2 is a perspective view of a controller forming part of the temperature control system illustrated in FIG. 1.

Referring to FIG. 1, a building structure such as a household is shown and is generally indicated by reference numeral 10. The structure is divided into a plurality of zones Z1 to Z4 with each zone encompassing one or more rooms within the building structure. A temperature control system 12 is located within the building structure 10 to allow the temperature within the various zones to be selectively controlled. In particular, the temperature control system 12 includes ducts 14 extending throughout the building structure to supply conditioned air to the zones Z1 to Z4 via diffusers 16. Motor actuated dampers 18 are provided in the ducts 14 adjacent each diffuser 16 to control the flow of conditioned air into the zones. The ducts 14 are connected to a conditioning unit 20 which includes a blower and either a heating unit or cooling unit or both.

The dampers may be of the two position or modulated type. In the case of two position dampers, each damper assumes either a fully closed position to isolate a zone from conditioned air or a fully opened condition to supply conditioned air. In the case of modulated dampers, each damper moves between its minimum position to minimize the flow of conditioned air to a zone and its maximum position to supply conditioned air to the zone. Although the remainder of the specification will refer to dampers of the two position type, it should be realized that either type of damper may be implemented in the temperature control system 12. Also, although not shown, it should be apparent that a by-pass damper can form part of the temperature control system 12 to relieve pressure in the ducts 14 when the dampers to a large number of zones are in a closed position.

An adjustable thermostat 22 is located in one of the zones, in this example zone Z2, and allows the desired temperature within the building structure 10 to be selected. The thermostat 22 is connected to the conditioning unit 20. Adjacent the thermostat 22 is a controller 24 which is connected to the thermostat 22 and the dampers 18. At least one remote temperature sensor 26, such as a thermistor, is provided in each zone with all of the remote sensors 26 being electrically connected to the controller 24. The thermostat 22 operates the conditioning unit 20 and the controller 24 controls the position of the dampers 18 in response to user input and input from the remote sensors 26 so that conditioned air is supplied to desired zones within the building structure as will be described.

FIGS. 2 to 5 best illustrate the controller 24. As can be seen it includes a housing 40 to be mounted on a wall within the building structure 10. The housing has two separable parts with one part 42 constituting the front wall 44 and side walls 46 of the housing and the other part constituting the back wall 48 of the housing. The back wall 48 has a pair of laterally spaced apertures 50 therein to permit fasteners to pass and secure the back wall to the wall of the building structure 10. Larger, laterally spaced apertures 52 are provided in the back wall 48 to permit wiring from the remote sensors 26, thermostat 22, dampers 18 and a power source (not shown) to pass. A connector assembly 54 is mounted on the back wall 48 and includes a pair of terminal blocks 56 designed to receive the wiring. The terminal blocks 56 are mounted on a printed circuit board 58 which also has a female plug-in connector 60 on it. The printed circuit board 58 establishes an electrical connection between the terminal blocks 56 and the pins of the connector 60.

Figure 3A:
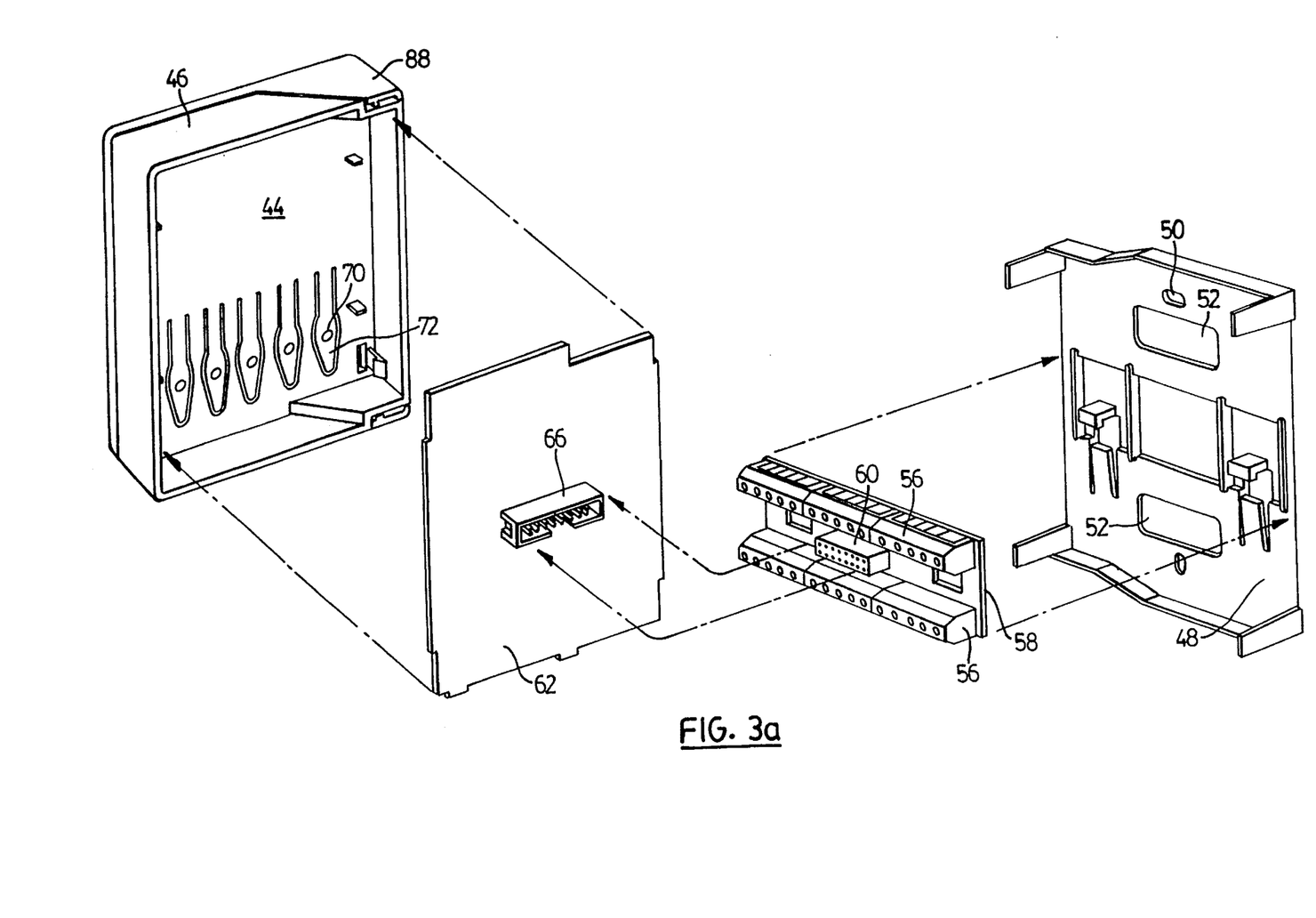
FIG. 3a is an exploded perspective view of the controller of FIG. 2.

Another larger printed circuit board 62 is mounted within part 42 of the housing 40 just below the front wall 44 and has a microprocessor based, central processing unit (CPU) 64 thereon. A male connector 66 complementary to connector 60 extends from the printed circuit board 62 to mate with the connector 60 to hold the two parts of the housing 40 together and establish an electrical connection between the CPU 64 and the wiring. The connectors 62 and 66 also establish a suitable mechanical connection between the two parts 42 and 48. The space 68 between the back wall 48 and the printed circuit board 62 provides room to accommodate the wiring.

Figure 3B:
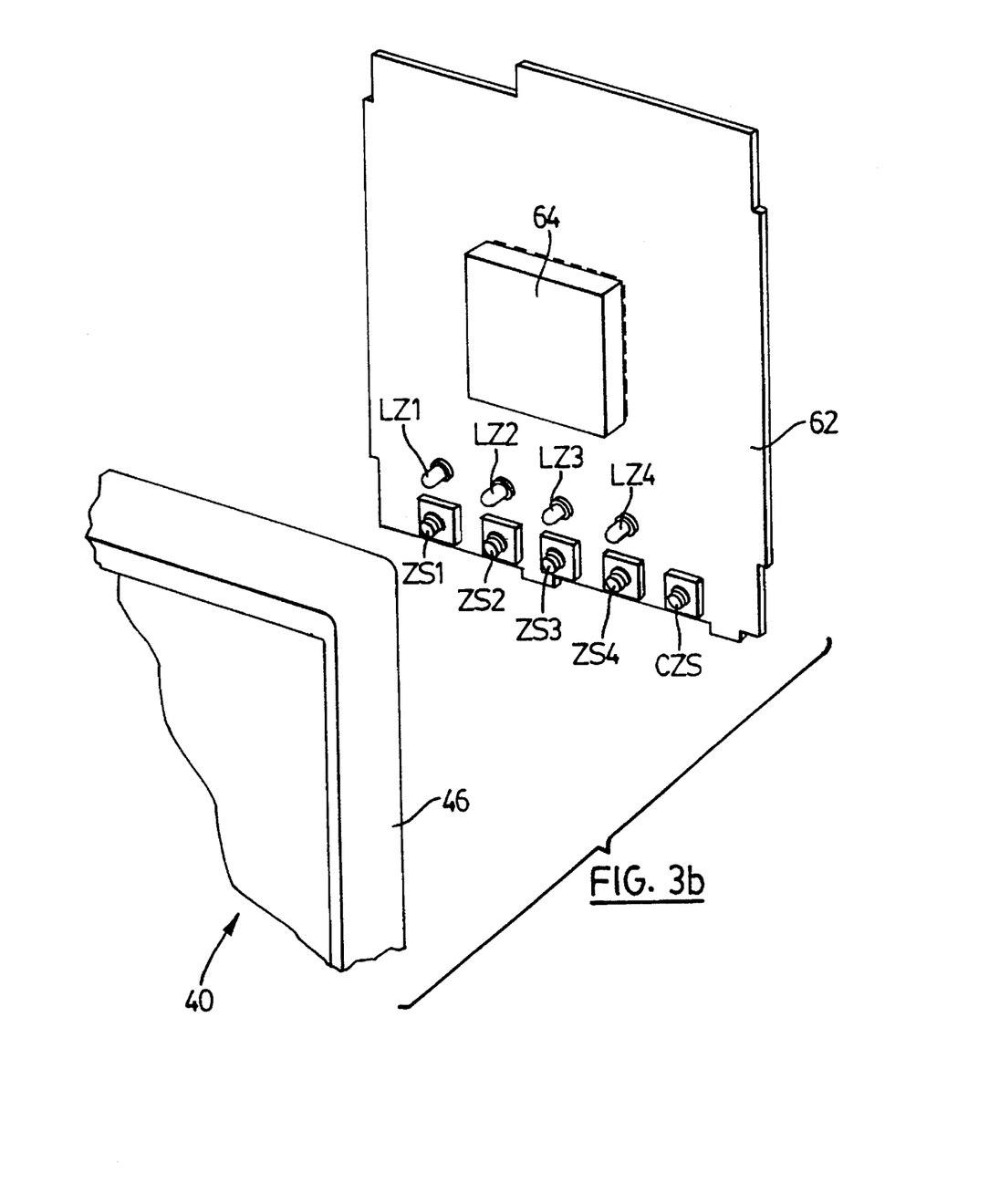
Figure 4:
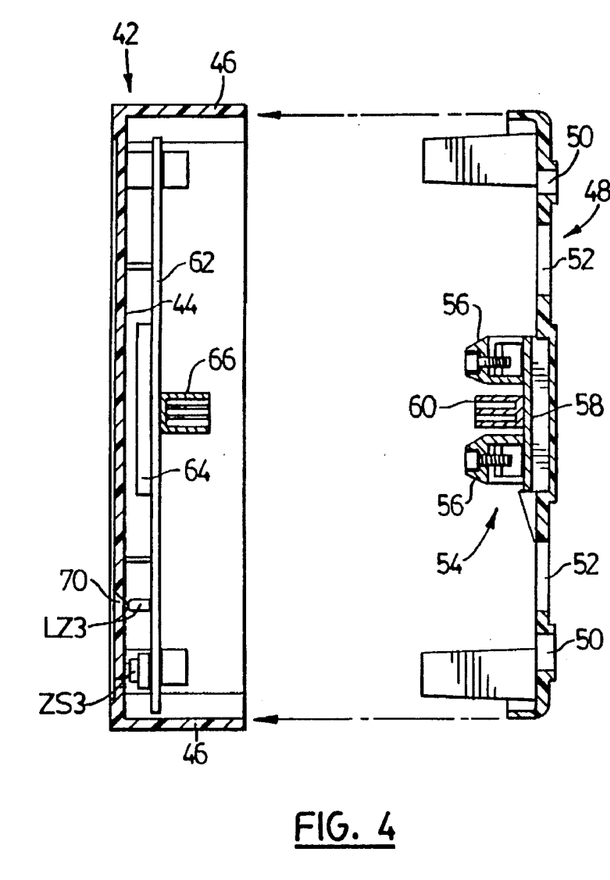
FIG. 4 is a section of FIG. 5 taken along line 4—4.

In addition to the CPU 64, the printed circuit board 62 has a plurality of push button zone switches ZS1 to ZS4 and a single push button control zone switch CZS on it (best shown in FIG. 3b). The zone switches are numbered consecutively in ascending order, in this case from 1 to 4, for reasons which will become evident. LEDs LZ1 to LZ4 are also on the printed circuit board 62 with each LED being associated with one of the zone switches. Apertures 70 are formed in the front wall 44 above the LEDs to accommodate them. Cuts 72 are also formed in the front wall 44 to define living hinges 76 above the LEDs that are associated with the zone switches ZS1 to ZS4 and the control zone switch CZS respectively.

Figure 5:
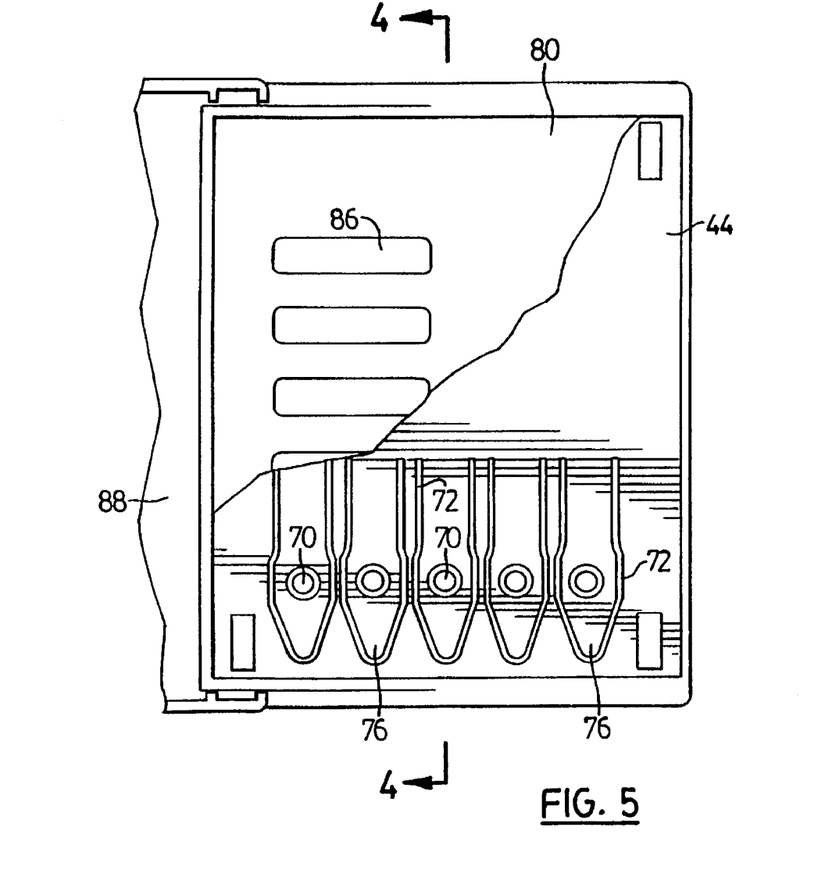
FIG. 5 is a top plan view of the controller of FIG. 2 with the door open and with a portion of the face plate removed.

A face plate 80 covers the front wall 44 and has translucent areas 82 on it which are located above the LEDs to allow them to be seen when they are illuminated. Surrounding the translucent areas 82 are switch contact areas 83 for a user to touch to actuate the zone switches. When a user contacts a switch contact area 83 above an LED or in the contact area 84 on the face plate 80 above the living hinge 76 in contact with the control zone switch CZS, the living hinge 76 pivots and depresses the switch below it. The face plate 80 also provides spaces 86 for information to be inserted indicating the rooms of the building structure 10 that are located in each of the four zones Z1 to Z4. A door 88 covers the front wall 44 but can be opened to expose the face plate 80.

The overall general operation of the temperature control system will now be described followed by a specific description of its operation. When the controller 24 is initialized, the controller examines the zones in ascending numerical order to determine whether the remote sensors 26 in the zones are functioning properly and to appoint the first zone it finds having a properly functioning remote sensor, as the control zone. Once a control zone has been appointed, the remaining zones that have yet to be checked are examined to determine if they have properly functioning remote sensors. If a remaining zone has a properly functioning remote sensor after a control zone has been appointed, the controller 24 automatically selects that zone by illuminating the LED associated with the zone and opening the damper 18 to the zone. When it is determined that the remote sensor in a zone is not functioning properly due to a short or open circuit, the controller 24 automatically opens the damper 18 to that zone but does not illuminate the LED associated with that zone. A zone of this nature is considered to be faulted.

In particular, upon initialization, the controller examines zone Z1 to determine whether the remote sensor 26 in zone Z1 is functioning properly and if so, appoints zone Z1 as the control zone for the temperature control system 12. If zone Z1 does not satisfy this check, the next zone Z2 is similarly checked. This process continues until all of the remaining zones Z3 to Z4 have been checked. Once a zone has been appointed as the control zone, the remaining zones in ascending numerical order are examined to determine if the remote sensors therein are properly functioning and whether these zones should be automatically selected. If no zone can be selected as the control zone, all of the dampers 18 are kept open and a visual indication of this fault condition is given via the LEDs. After the fault condition has been signified, the controller 24 performs the above described steps again to attempt to locate a zone having a properly functioning remote sensor and this process continues until such a zone is located.

Once a zone has been selected as a control zone, the controller 24 causes the LED associated with that zone to blink. The controller also illuminates the LEDs associated with the zones of numerical denomination higher than that of the control zones if they have been automatically selected. The controller 24 then connects the remote sensor 26 in the control zone to the thermostat 22. As is known to those of skill in the art, the thermostat 22 provides an output to the conditioning unit 20 when the temperature in the control zone as detected by the remote sensor 26 therein, falls below or exceeds the temperature setting of the thermostat, depending on whether the temperature control system is conditioned to heat or cool the building structure 10. Thus, conditioned air is supplied to the selected zones and to the faulted zones (ie. those zones having improperly functioning remote sensors) via the ducts 14 and diffusers 16. When the temperature in the control zone as detected by the remote sensor 26 therein, reaches the temperature set point of the thermostat 22, the controller 24 shuts the conditioning unit 20 off.

In normal operation after the temperature control system 12 has been initialized, zone Z1 is appointed as the control zone and the remaining zones Z2 to Z4 are automatically selected. If the remote sensors 26 in one or more zones are not properly functioning, the zone appointed as the control zone may be another zone and not all zones may be automatically selected. After initialization, zones that have been automatically selected may be deselected by pushing the switch contact area 83 associated with these zones. When this is done, the controller turns the LEDs associated with those zones off and closes the dampers 18 to those zones isolating them and preventing them from receiving conditioned air. Zones that have been deselected can be selected again by pushing the switch contact areas 83. If this occurs, the controller 24 once again illuminates the LEDs associated with the selected zones and opens the dampers 18 to those zones so that they receive conditioned air.

The control zone can also be changed by pushing contact area 84. When this area is pressed, the controller 24 automatically appoints an already selected zone as the new control zone. Particularly, the controller appoints the zone having the next highest numerical denomination compared to the current control zone, which is in a selected state. In the case of zone 4, the controller 24 loops back to zone 1 to locate the next control zone. For the purpose of this specification, the phrase "next available zone" will refer to a selected zone which will be appointed by the controller as the control zone when the switch contact area 84 is pushed.

When a new control zone has been selected, the controller 24 maintains the former control zone in a selected state as visually indicated by continuously illuminating its LED and causes the LED of the new control zone to blink. However, the controller delays making the connection between the remote sensor 26 in the new control zone and the thermostat 22 until a predetermined amount of time has elapsed after the control zone switch CZS has been released to permit a user to cycle through the zones before a zone is finally selected to be the control zone. During the delay, the connection between the remote sensor 26 in the former control zone and the thermostat 22 is maintained. This prevents the conditioning unit 20 from receiving input from the thermostat 22 until the control zone has finally been selected.

Therefore, the controller 24 is designed to allow one zone to be selected as the control zone so that only the temperature in that zone will be examined to make a heating or cooling decision for the entire temperature control system 12. The controller is also designed to allow the various zones to be selected so that conditioned air is only supplied to the selected and faulted zones with unselected, unfaulted zones being isolated from conditioned air. In this manner, different zones within the building structure 10 can be selected to receive conditioned air at different times allowing unoccupied areas of the building structure to be isolated from the conditioning unit 20. This allows equipment to be downsized reducing costs.

The specific operation of the controller 24 will now be described more fully with particular reference to FIGS. 6a to 9. When the temperature control system 12 is initialized, the CPU enters an initialization routine shown in FIGS. 6a and 6b and identified by reference numeral 200 to appoint a control zone CZ and to select automatically other zones. In the initialization routine, the CPU resets a watchdog (block 202) and then provides output signals to each of the dampers 18 to cause them to open (block 204). Once this has been done, the CPU connects the remote sensor 26 in zone Z1 to the thermostat 22 (block 206). The CPU then examines the remote sensor 26 to determine if the remote sensor 26 is properly functioning (block 208). A remote sensor is considered functional if its impedance as seen by the controller 24 lies within normal operating parameters. If the remote sensor 26 is detected as functioning properly, the CPU causes the LED LZ1 associated with zone Z1 to illuminate (block 210). The CPU then designates zone Z1 as the control zone and causes the LED LZ1 to blink (block 212).

Figure 6A:
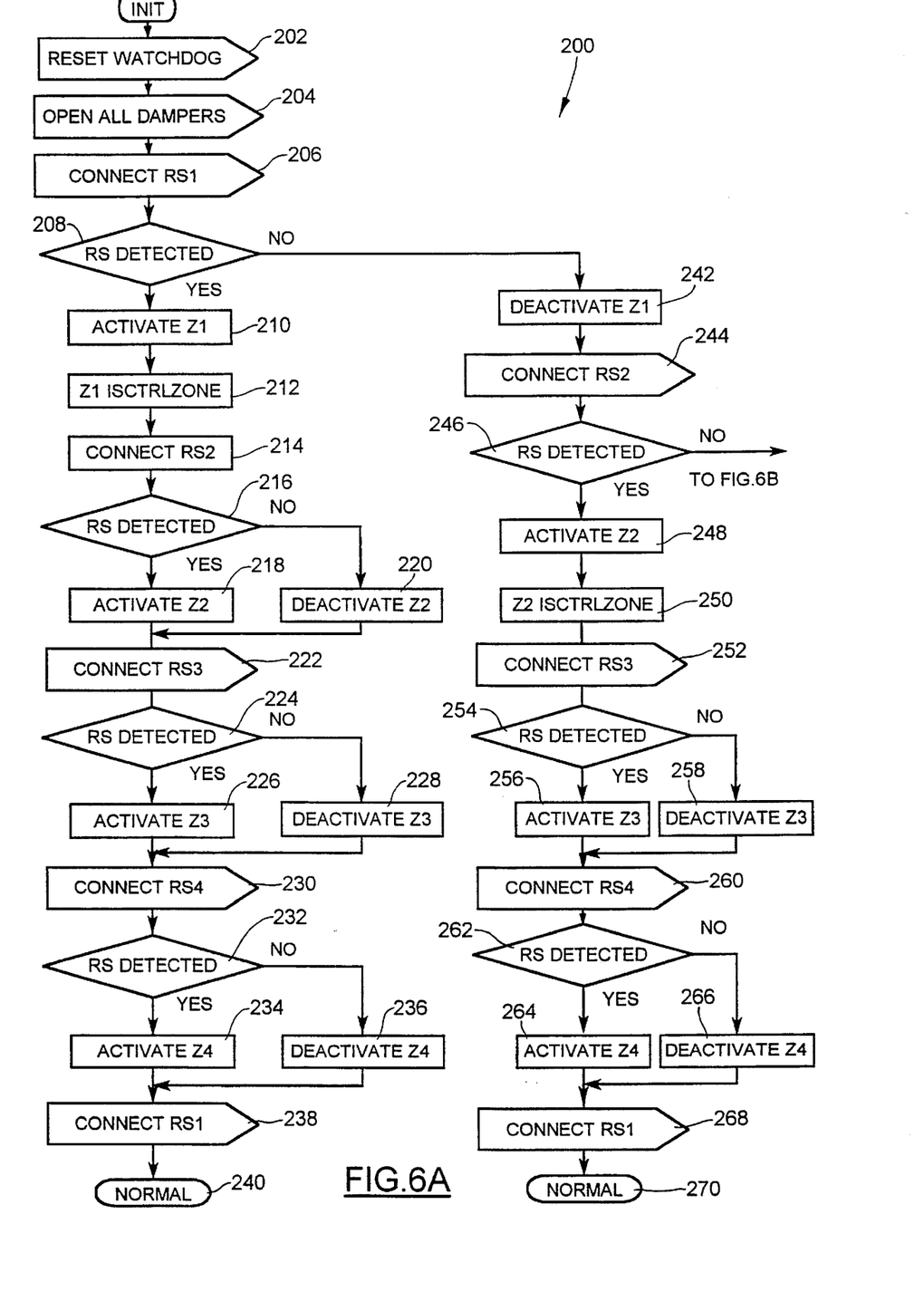
FIGS. 6a and 6b are flowcharts illustrating an initialization routine performed by the controller of FIG. 2.
Figure 6B:
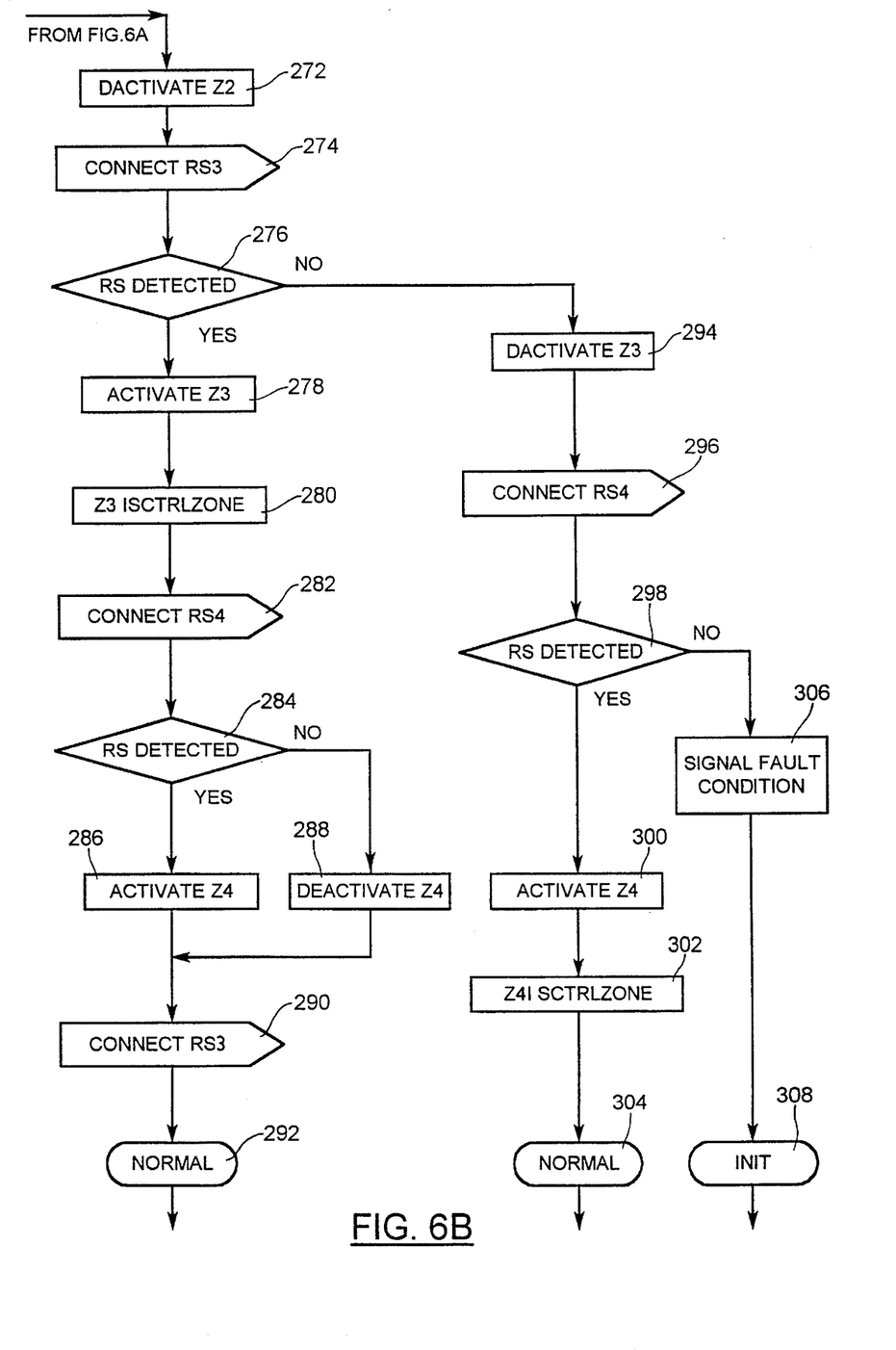

Once this has been done, the controller 24 examines the remaining zones in ascending numerical order to determine if they should be automatically selected. In particular, the CPU connects the remote sensor 26 in zone Z2 to the thermostat 22 (block 214) and examines the remote sensor 26 to determine if it is properly functioning (block 216). If the remote sensor is properly functioning, the CPU causes the LED LZ2 associated with zone Z2 to illuminate (block 218). If the remote sensor 26 is not properly functioning, the zone is considered faulted. In this instance, the CPU does not illuminate the LED but maintains the control signal to the damper 18 associated with zone Z2 to keep it open (block 220). After one of these two decision paths has been completed, the CPU performs identical routines dealing with zones Z3 and Z4 to determine whether the remote sensors 26 in the zones are properly functioning and whether the zones should be automatically selected or designated faulted. Once these steps have been completed, the CPU re-connects the remote sensor 26 in the control zone, in this case zone Z1, to the thermostat 22 (block 238) and proceeds to a normal state routine (block 240).

If during the initialization routine, the remote sensor 26 associated with zone Z1 is not functioning as determined at block 208, the zone Z1 is considered faulted and therefore, the CPU does not illuminate the LED but maintains the control signal to the damper 18 (block 242). After this, the CPU connects the remote sensor 26 in zone Z2 to the thermostat 22 to determine if the remote sensor is properly functioning (blocks 244 and 246). If the remote sensor is properly functioning, the CPU causes the LED LZ2 to illuminate (block 248). The CPU then designates zone Z2 as the control zone and causes the LED LZ2 to blink (block 250). After this has been done, the CPU performs routines similar to those described above to determine if the remote sensors 26 in zones Z3 and Z4 are properly functioning and whether those zones should be automatically selected prior to reconnecting the remote sensor 26 in zone Z2 to the thermostat 22 and entering the normal state routine (blocks 252 to 270).

If the remote sensor in zone Z2 is not detected as being properly connected to the thermostat at block 246, the zone Z2 is considered faulted. Therefore, the CPU does not illuminate the LED LZ2 but maintains the control signal to the damper 18 keeping it open (block 272). After this, the CPU connects the remote sensor in zone Z3 to the thermostat 22 to determine if the remote sensor is properly functioning (block 274). If the remote sensor is properly functioning, the CPU causes the LED LZ3 to illuminate (block 278), designates zone Z3 as the control zone and causes the LED to blink (block 280). The CPU 64 then disconnects the remote sensor in the zone Z3 and connects the remote sensor in zone Z4 to the thermostat 22 to determine if the remote sensor is properly functioning and whether zone Z4 should be automatically selected (blocks 282 and 284). If the remote sensor is functioning properly, the LED LZ4 is illuminated and the connection between the remote sensor 26 in the control zone Z3 and the thermostat 22 is re-established (block 290). Otherwise, the LED LZ4 is kept off but the damper 18 is kept open (block 288) before the connection between the remote sensor 26 in the control zone and the thermostat 22 is re-established.

If the remote sensor in zone Z3 is not functioning properly as detected at block 276, the CPU 64 does not illuminate the LED LZ3 but maintains the control signal to the damper 18 to keep it open (block 296), the CPU 64 then connects the remote sensor in zone Z4 to the thermostat 22 to determine if it is functioning properly (block 298). If it is, the CPU illuminates the LED LZ4 and designates zone Z4 as the control zone. The CPU then causes the LED LZ4 to blink and enters the normal state routine (blocks 300 to 304). If the remote sensor in zone Z4 is not functioning properly, a condition in the temperature control system 12 exists where no remote sensors are properly functioning.

If no remote sensors are detected as functioning properly, the CPU causes all of the LEDs to blink in unison signifying a fault condition (block 306). The CPU then reverts back to the beginning of the initialization routine 200 (see block 308) and the process is repeated as the CPU attempts to locate a zone which can be designated as the control zone and to locate zones of higher numerical denomination than the control zone which can be automatically selected.

Figure 7A:
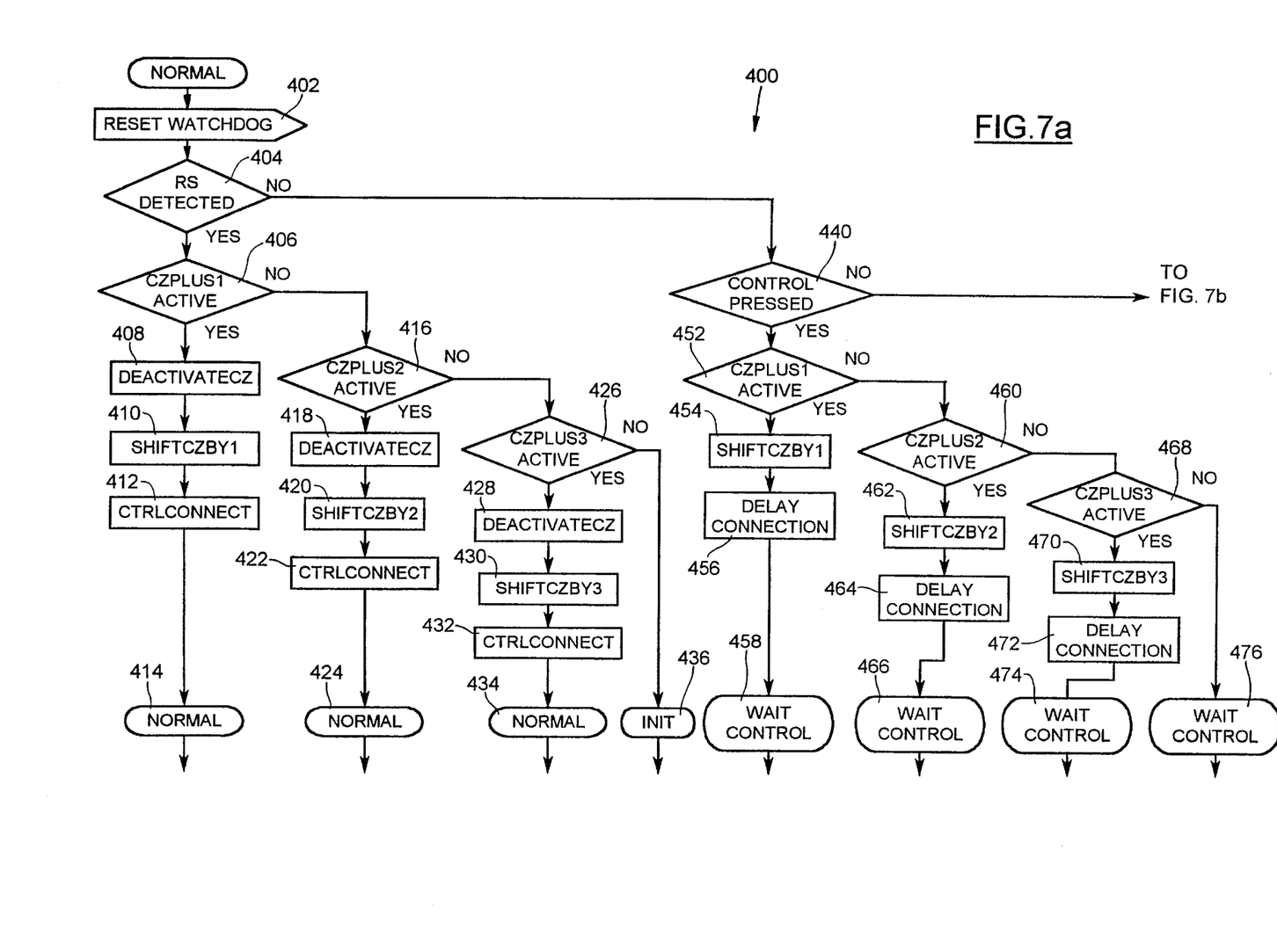
FIGS. 7a and 7b are flowcharts illustrating a normal state routine performed by the controller of FIG. 2.
Figure 7B:
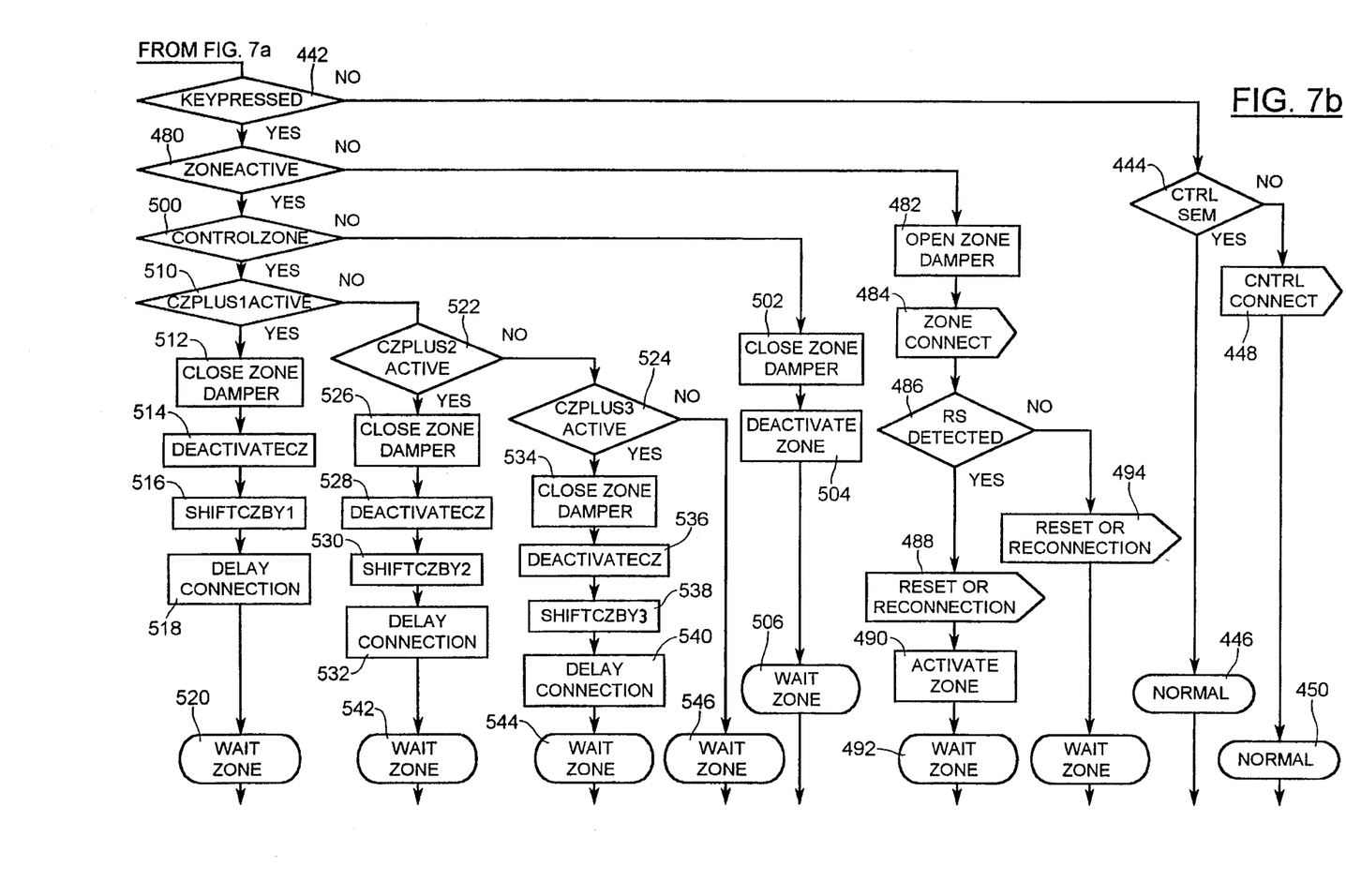
Figure 8:
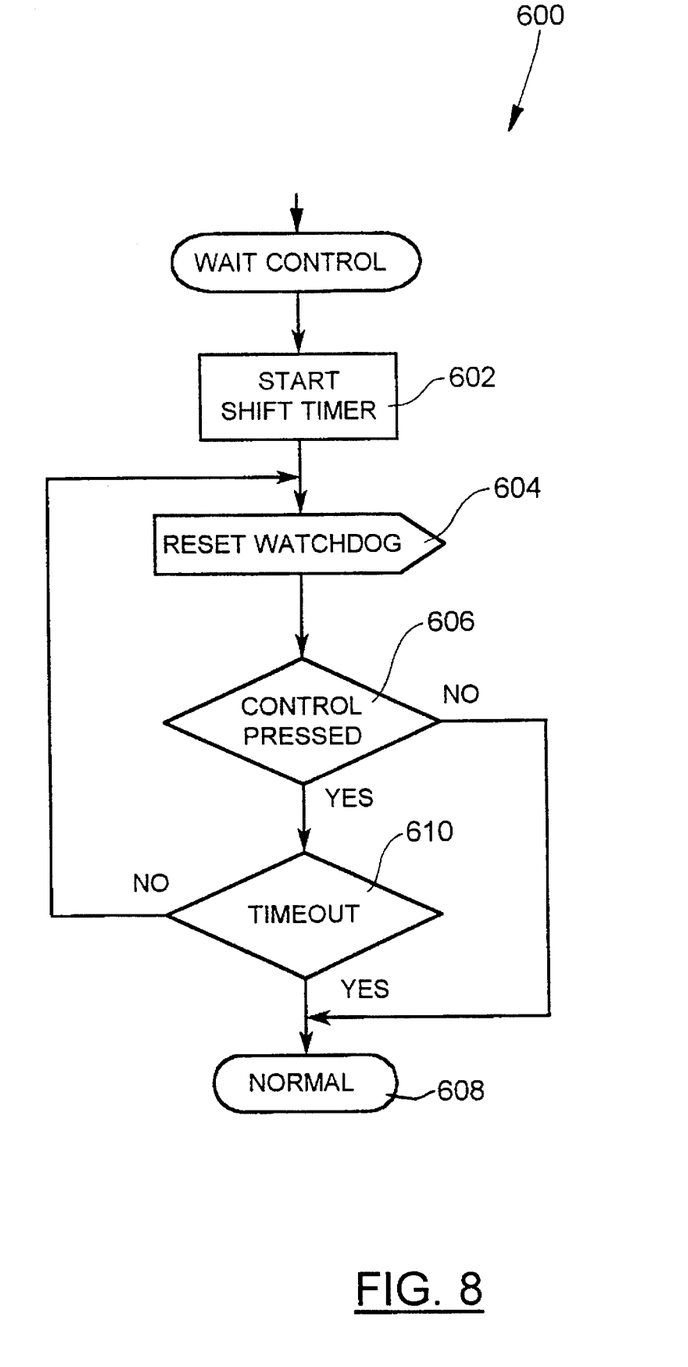
FIG. 8 is a flowchart illustrating a wait control routine performed by the controller of FIG. 2.

Once the CPU has completed the initialization routine 200 via one of blocks 240, 270, 292 or 304, it enters the normal state routine 400 (best shown in FIGS. 7a and 7b). In this routine, the CPU resets the watchdog (block 402) and checks to see if the remote sensor 26 in the control zone is still properly functioning (block 404). If the CPU determines that the remote sensor 26 is not functioning properly, the CPU 64 begins a routine to locate the next available zone to be appointed as the new control zone. This is done by examining the remaining zones in ascending numerical order from the control zone, until a selected zone is located. When zone Z4 is examined, the CPU loops back to zone Z1 if zone Z1 was not the control zone, until all of the remaining zones have been examined.

Particularly, when the remote sensor 26 in the control zone is not functioning properly as detected at block 404, the CPU determines whether the next zone (CZ+1) is selected (i.e. is the LED illuminated?) (block 406). If it is selected, the CPU deactivates the control zone by turning the blinking LED off and disconnecting the remote sensor 26 in that zone from the thermostat 22 (block 408). The damper 18 to that zone is however kept open because the zone is considered faulted. The CPU then designates the zone (CZ+1) as the control zone causing the LED associated with that zone to blink (block 410) and connects the remote sensor 26 in that zone to the thermostat 22 (block 412). After this has been completed, the CPU reverts back to the beginning of the normal state routine 400 (block 414). If at block 406 the zone (CZ+1) is not selected, the CPU polls the zone next to that one (CZ+2) to determine if it is selected (block 416). If that zone is selected, the CPU deactivates the control zone by turning the blinking LED off and disconnecting the remote sensor 26 in the control zone from the thermostat (block 418). The damper 18 to that zone is however kept open. The CPU then designates the zone (CZ+2) as the control zone, causes its LED to blink and connects the remote sensor in that zone to the thermostat 22 (blocks 420 and 422) before entering the normal state routine (block 424). If zone (CZ+2) is not selected, this process continues for zone (CZ+3) to determine if that zone can be appointed as the new control zone (blocks 426 to 434). If no selected zones are detected, the CPU re-enters the initialization routine 200 (block 436).

When the remote sensor in the control zone is functioning properly as detected at block 404, the CPU monitors the control zone switch CZS to determine if the switch is pressed (block 440). If the switch is not pressed, the CPU monitors the zone switches ZS1 to ZS4 to determine if any of the switches are pressed (block 442). If none of the switches are pressed, the CPU examines the state of a semaphore control mechanism (block 444) as will be described. If the state of the semaphore control mechanism is in the "yes" condition, the CPU reverts to the beginning of the normal state routine 400 (block 446). If however, the state of the semaphore control mechanism is in the "no" condition, the CPU asserts the connection between the remote sensor 26 in the zone with the blinking LED and the thermostat 22 (block 448) before reverting to the beginning of the normal state routine (block 450).

If the CPU detects that the control zone switch CZS is pressed at block 440, the CPU examines the next zone from the control zone (CZ+1) to determine if it is selected (block 452). If the zone is selected, the CPU stops the LED in the control zone from blinking, causes the LED of the zone (CZ+1) to start blinking (block 454) and then initiates the semaphore control mechanism (block 456). When initiated, the semaphore control mechanism starts a countdown timer and sets itself to its "yes" condition. Upon the expiration of the timer, the semaphore control mechanism is set to its "no" condition. If the mechanism is invoked while the timer is running, the timer is re-initialized. Once this has been done, the CPU enters a wait control routine (block 458). The semaphore is used to ensure that the predetermined amount of time elapses after the control zone switch has been released before the remote sensor 26 in the new control zone (i.e. the zone with the blinking LED) is connected to the thermostat 22.

If the first zone examined after the control zone switch has been pressed, is not selected at block 452, the zone next to that one (CZ+2) is examined by the CPU to determine whether it is selected (block 460). If that zone is selected identical steps to steps 454 and 456 are performed (blocks 462 and 464) before the CPU enters the wait control routine (block 466). If zone (CZ+2) is not selected, the CPU examines zone (CZ+3) (block 468). If that zone is selected, identical steps to steps 454 and 456 are performed (blocks 470 and 472) before the CPU enters the wait control routine (block 474). If the original control zone is the only selected zone, the CPU ignores the control zone change request and enters the wait control routine (block 476).

In the wait control routine 600 (best seen in FIG. 8), the CPU initiates a shift timer (block 602) and then resets the watchdog (block 604). The CPU then monitors the state of the control zone switch CZS (block 606) and if it is released, the CPU re-enters the normal state routine 400 (block 608). If the CPU detects the state of the control zone switch CZS as still being pressed, the CPU polls the shift timer to determine whether it has timed out (block 610). If the shift timer has not timed out, the CPU reverts back to step 604 and the process is recommenced. If on the other hand the shift timer has timed out, the CPU re-enters the normal state routine 400 via block 608. This loop is performed to allow the control zone switch to be held continuously while ensuring that the CPU acknowledges this as a series of control zone change requests.

If the CPU determines that the control zone switch CZS is not pressed at block 440 but has determined that one of the zone switches is pressed at block 442, the CPU examines the status of the zone associated with the pressed switch to determine if that zone is selected (block 480). If the zone is not selected, the CPU provides a control signal to the damper 18 associated with that zone to open it (block 484) and connects the remote sensor 26 in that zone to the thermostat 22 (block 482). The CPU then checks to ensure that the remote sensor 26 is properly functioning by connecting it to the thermostat 22. If the remote sensor 26 is properly functioning, the CPU disconnects the remote sensor 26 from the thermostat and reestablishes the connection between the thermostat 22 and the remote sensor in the control zone (block 488). Once this is done, the CPU illuminates the LED for the zone associated with the pressed zone switch (block 490) signifying that the zone has been selected and then proceeds to a wait zone routine (block 492).

If the remote sensor is not functioning properly as detected at block 486, the CPU disconnects the remote sensor 26 from the thermostat 22 and reestablishes the connection between the thermostat 22 and the remote sensor 26 in the control zone (block 494). The damper 18 to that zone is however, kept open. Once this is done, the CPU proceeds to the wait zone routine (block 496). When the zone switch associated with a zone having a faulty remote sensor 26 is pressed, the CPU does not illuminate the LED associated with that zone even though the damper 18 to the zone is opened. This provides a visual indication to the user that the remote sensor in that zone is not properly functioning and that the zone is faulted.

If the zone associated with the pressed zone switch is selected at block 480, the CPU determines whether the zone associated with the pressed switch is the control zone (block 500). If the zone is not the control zone, the CPU removes the control signal to the damper 18 associated with that zone causing it to close (block 502). The CPU then turns the LED associated with that zone off (block 504) and enters the wait zone routine (block 506).

If the zone associated with the pressed zone switch is detected as being the control zone at block 500, the CPU looks for the next available zone to appoint as the control zone. Particularly, the CPU determines whether the next zone (CZ+1) is selected (block 510). If the zone (CZ+1) is selected, the CPU removes the control signal to the damper 18 of the control zone causing it to close (block 512). The CPU then turns the blinking LED of the control zone off (block 514) and activates the LED associated with the zone (CZ+1) causing it to blink. The semaphore control mechanism is then initialized causing its state to be set to the "yes" condition and the timer is initialized or re-initialized. This is done to ensure that the predetermined amount of time elapses before the remote sensor 26 in the zone with the blinking LED is connected to the thermostat 22. Once the remote sensor has been connected to the thermostat 22, the CPU enters the wait zone routine (block 520).

If at block 510 the zone (CZ+1) is not selected, the CPU examines the zone after that one (CZ+2) to determine if it is selected so that it may be appointed as the new control zone. If that zone is not selected, the CPU examines the remaining zones in order to locate a selected zone (blocks 522 and 524). Once a selected zone has been detected, the CPU performs similar steps to those at blocks 512 to 518 (blocks 526 to 532 or 534 to 540) and then enters the wait zone routine (blocks 542 or 544). If no other zone is selected, the CPU proceeds directly to the wait zone routine (block 546). In this instance, the control zone change request is ignored.

Figure 9:
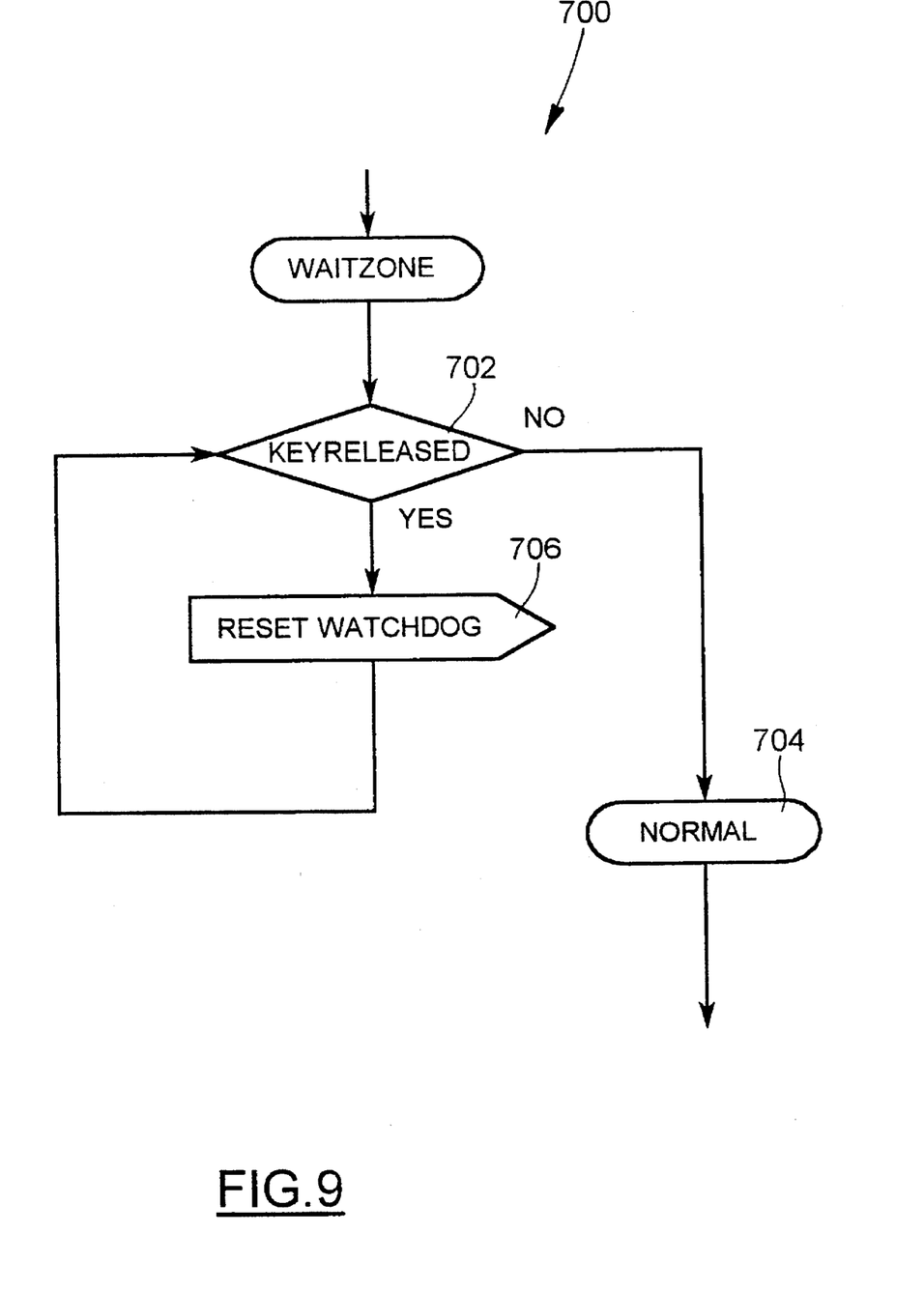
FIG. 9 is a flowchart illustrating a wait zone routine performed by the controller of FIG. 2.

In the wait zone routine 700, the CPU examines the status of the pushed zone switch to determine whether the switch has been released. If the switch is detected as being released, the CPU re-enters the normal state routine 400 (block 704). If the switch is not released, the CPU resets the watchdog (block 706) and reverts back to block 702 to determine the switch status.

Although not shown, if excessive noise arises or if there are power surges or interruptions, the CPU performs an automatic reset and reenters the initialization routine 200.

The present invention provides advantages in that only the selected or faulted zones receive conditioned air while unselected, unfaulted zones are isolated from the conditioning unit. Therefore, in building structures such as households different areas of the house can be selected at different times of the day so that only occupied areas of the household receive conditioned air. For example, in the evenings only zones encompassing bedrooms can be selected. Also, since only the remote sensor in the control zone is used to make a heating or cooling decision for all of the selected zones, the zone encompassing the room where the most accurate climate control is desired can be selected as the control zone.

The design of the controller also provides advantages in that it can be easily wired since the back plate is removable from the remainder of the housing but yet allows a simple reconnection through the mating plug-in connectors and by providing space to accommodate the wiring entering the housing 40 via the apertures.

Although the present invention has been described as servicing a four zone structure, it should be realized that the controller can be designed to service more or fewer zones. Also, although the controller and thermostat have been shown as two separate units, it should be realized that the controller and thermostat can be formed as a single unit for installation in the building structure.

Although the thermostat and controller are shown in zone Z2, it should be realized that they do not need to be located in a particular zone receiving conditioned air. For example, they may be located in areas of the structure not encompassed by zones or even outside of the building structure. It should also be apparent that although the CPU is described as connecting the remote sensors to the thermostat, the controller may be designed to poll the sensed temperature output of the remote sensors and communicate the sensed temperature output of the remote sensors to the thermostat.

We claim:

1. A temperature control system to supply conditioned air to a plurality of zones via ducts extending to the zones comprising:

at least one temperature sensing device in each of said zones;

a thermostat to allow a desired temperature setting to be selected; and a controller acting between said thermostat and said temperature sensing devices, said controller including selection means to allow one of said zones to be designated as a control zone and to allow other zones to be selected by opening dampers in the ducts extending to the selected zones to control the flow of conditioned air thereto, the dampers in the ducts extending to deselected zones being maintained in a closed condition to isolate them from conditioned air; and display means to provide a visual indication of the selected zones and a different visual indication of the control zone, said controller making a heating or cooling decision for said temperature control system on the basis of the desired temperature setting and the output of the at least one temperature sensing device in said control zone.

2. A temperature control system as defined in claim 1 wherein said controller inhibits zones having at least one faulty temperature sensing device from being selected.

3. A temperature control system as defined in claim 2 wherein said controller opens the dampers to zones having at least one faulty temperature sensing device.

4. A temperature control system as defined in claim 3 wherein said controller further includes connection means to connect the at least one temperature sensing device in said control zone to said thermostat.

5. A temperature control system as defined in claim 1 wherein said zones are selected to encompass areas which are typically occupied at various times to permit unoccupied zones to be unselected or deselected.

6. A temperature control system to supply conditioned air to a plurality of zones via ducts extending to the zones comprising:

at least one temperature sensing device in each of said zones, said zones being numerically ordered;

a thermostat to allow a desired temperature setting to be selected; and a controller acting between said thermostat and said temperature sensing devices, said controller including selection means to allow one of said zones to be designated as a control zone and to allow other zones to be selected by opening dampers in the ducts extending to the selected zones to control the flow of conditioned air thereto, the dampers in the ducts extending to deselected zones being maintained in a closed condition to isolate them from conditioned air, said selection means including user input means to allow said control zone to be changed, said selection means changing control from the existing control zone to the next available selected zone in response to user input, said controller making a heating or cooling decision for said temperature control system on the basis of the desired temperature setting and the output of the at least one temperature sensing device in said control zone.

7. A temperature control system as defined in claim 6 wherein said controller automatically appoints a zone as said control zone when said temperature control system is initialized.

8. A temperature control system as defined in claim 7 wherein said controller initially examines the zones in numerical ascending order and appoints the first examined zone having a functioning temperature sensing device as said control zone.

9. A temperature control system as defined in claim 8 wherein said controller examines the remaining zones after the control zone has been appointed and automatically selects zones having functioning temperature sensing devices.

10. A temperature control system as defined in claim 9 wherein said controller connects the temperature sensing device of the zone to the thermostat to determine whether the temperature sensing device in that zone is properly functioning, said controller signifying a fault condition when no zones are located having properly operating temperature sensing devices.

11. A temperature control system as defined in claim 10 wherein said controller opens the dampers to each of the zones in said fault condition.

12. A temperature control system as defined in claim 9 wherein said controller opens the dampers to a zone when the temperature sensing device therein is detected as functioning improperly.

13. A temperature control system to supply conditioned air to a plurality of zones via ducts extending to said zones comprising:

at least one temperature sensing device in each of said zones, at least one zone having at least two temperatures sensing devices therein;

a thermostat to allow a desired temperature setting to be selected; and a controller including selection means to allow one of said zones to be designated as a control zone and to allow other zones to be selected by opening dampers in the ducts extending to the selected zones to control the flow of conditioned air thereto, the dampers in the ducts extending to deselected zones being maintained in a closed condition to isolate them from conditioned air, said controller making a heating or cooling decision for said temperature control system on the basis of the desired temperature setting and the output of the at least one temperature sensing device in said control zone, said controller averaging the output of said at least two temperature sensing devices when said zone having the at least two temperature sensing devices therein is said control zone and a heating or cooling decision is being made.

14. A controller for a temperature control system, said temperature control system supplying conditioned air to a plurality of zones via a duct extending to each zone, each of said ducts having a damper therein actuable between an opened condition wherein conditioned air is supplied to said zone and a closed condition wherein said zone is isolated from conditioned air, each of said zones having at least one temperature sensing device therein to sense the temperature in said zone, said temperature control system further including a thermostat to select a desired temperature for said temperature control system, said controller comprising:

selection means to allow one of said zones to be designated as a control zone and to allow other zones to be selected by opening dampers in the ducts extending to the selected zones to control the flow of conditioned air thereto, the dampers in the ducts extending to deselected zones being maintained in a closed condition to isolate them from conditioned air;

control means responsive to said selection means and acting between the temperature sensing device in said control zone and said thermostat, said controller making a heating or cooling decision for said temperature control system on the basis of the desired temperature and the output of the at least one temperature sensing device in said control zone; and display means to provide a visual indication of the selected zones and a different visual indication of the control zone.

15. A controller as defined in claim 14 wherein said controller inhibits zones having at least one faulty temperature sensing device from being selected.

16. A controller as defined in claim 15 wherein said controller opens the dampers to zones having at least one faulty temperature sensing device.

17. A controller as defined in claim 16 wherein said controller further includes connection means to connect the at least one temperature sensing device in said control zone to said thermostat.

18. A controller as defined in claim 17 wherein said zones are numerically ordered and wherein said selection means includes user input means to allow said control zone to be changed, said selection means changing control from the existing control zone to the next available selected zone in response to user input.

19. A controller as defined in claim 18 wherein said controller automatically appoints a zone as said control zone when said temperature control system is initialized.

20. A controller as defined in claim 19 wherein said controller initially examines the zones in numerical ascending order and appoints the first examined zone having a functioning temperature sensing device as said control zone.

21. A controller as defined in claim 20 wherein said controller examines the remaining zones after the control zone has been appointed and automatically selects zones having functioning temperature sensing devices.

22. A controller as defined in claim 21 wherein said controller connects the temperature sensing device of the zone to the thermostat to determine whether the temperature sensing device in that zone is properly functioning, said controller signifying a fault condition via said display means when no zones are located having properly operating temperature sensing devices.

23. A controller as defined in claim 22 wherein said controller opens the dampers to each of the zones in said fault condition.

24. A controller as defined in claim 23 wherein said controller opens the dampers to a zone when the temperature sensing device therein is detected as functioning improperly.

* * * * *